United States Patent
Ash et al.

[19]

[11] Patent Number: 6,123,535
[45] Date of Patent: *Sep. 26, 2000

[54] MOLDING APPARATUS FOR ENCAPSULATING A PART

[75] Inventors: Charles E. Ash, Perrysburg; Gary W. Bernier, Waterville, both of Ohio; David W. Lahnala, Adrian, Mich.; H. Richard Voght, Perrysburg, Ohio

[73] Assignee: Libbey-Owens-Ford Co., Toledo, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,207

[22] Filed: Jul. 22, 1997

Related U.S. Application Data

[60] Provisional application No. 60/023,007, Aug. 2, 1996.

[51] Int. Cl.[7] ............................. B29C 33/26; B29C 33/12
[52] U.S. Cl. ....................... 425/125; 425/576; 425/129.1; 425/162
[58] Field of Search ..................... 425/574, 575, 425/577, 576, 402, 323, 126.1, 129.1, 546, 125, 127, 162; 264/252, 275, 323

[56] References Cited

U.S. PATENT DOCUMENTS

| | | | |
|---|---|---|---|
| 2,622,274 | 12/1952 | Soderquist | 425/409 |
| 3,381,340 | 5/1968 | Chapin, Jr. . | |
| 3,407,443 | 10/1968 | Beebee et al. . | |
| 3,577,591 | 5/1971 | Ricards | 425/409 |
| 3,915,617 | 10/1975 | Saladin | 425/501 |
| 4,269,587 | 5/1981 | Tranter | 425/408 |
| 4,354,819 | 10/1982 | Wirz | 425/409 |
| 4,363,191 | 12/1982 | Morgan . | |
| 4,396,221 | 8/1983 | Morgan et al. . | |
| 4,561,625 | 12/1985 | Weaver . | |
| 4,584,155 | 4/1986 | Zanella . | |
| 4,688,752 | 8/1987 | Barteck et al. | 425/116 |
| 4,762,481 | 8/1988 | Weaver . | |
| 4,777,699 | 10/1988 | Hill et al. . | |
| 4,858,988 | 8/1989 | Morgan et al. . | |
| 5,061,429 | 10/1991 | Yoshihara et al. | 264/252 |
| 5,116,556 | 5/1992 | Danton | 264/252 |
| 5,154,028 | 10/1992 | Hill et al. . | |
| 5,158,638 | 10/1992 | Osanami et al. . | |
| 5,273,416 | 12/1993 | Heyn et al. | 425/127 |
| 5,456,874 | 10/1995 | Cordes et al. | 264/138 |
| 5,464,575 | 11/1995 | Jaffiol et al. . | |
| 5,529,476 | 6/1996 | Borasio et al. . | |
| 5,584,526 | 12/1996 | Soldner . | |

FOREIGN PATENT DOCUMENTS 1080271  8/1967  United Kingdom .

*Primary Examiner*—Angela Ortiz
*Attorney, Agent, or Firm*—Marshall & Melhorn

[57] ABSTRACT

A molding apparatus and method of use thereof. The molding apparatus has a stationary mold base, and at least one moveable mold core rotatable into and out of a facing relationship with the stationary mold base. When the moveable mold core is in its closed position, it cooperates with the stationary mold base to define a mold cavity. The mold base may be shaped so as to aid in forming a part, or to hold a sheet of material onto which molding material is to be deposited so as to encapsulate the part on one or more edges or surface regions. Structure may also be encapsulated onto the surface of the material during the molding operation.

24 Claims, 14 Drawing Sheets

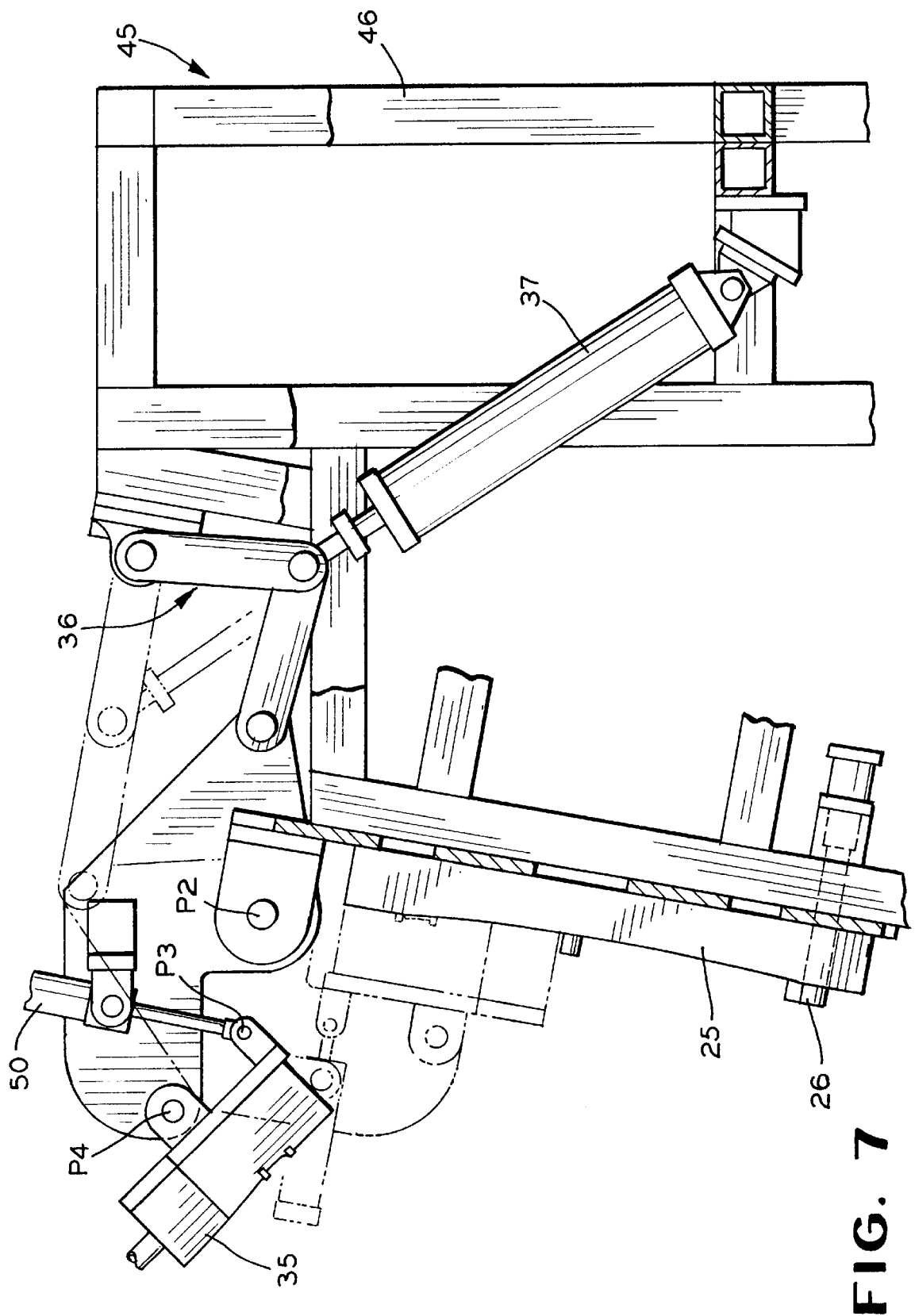

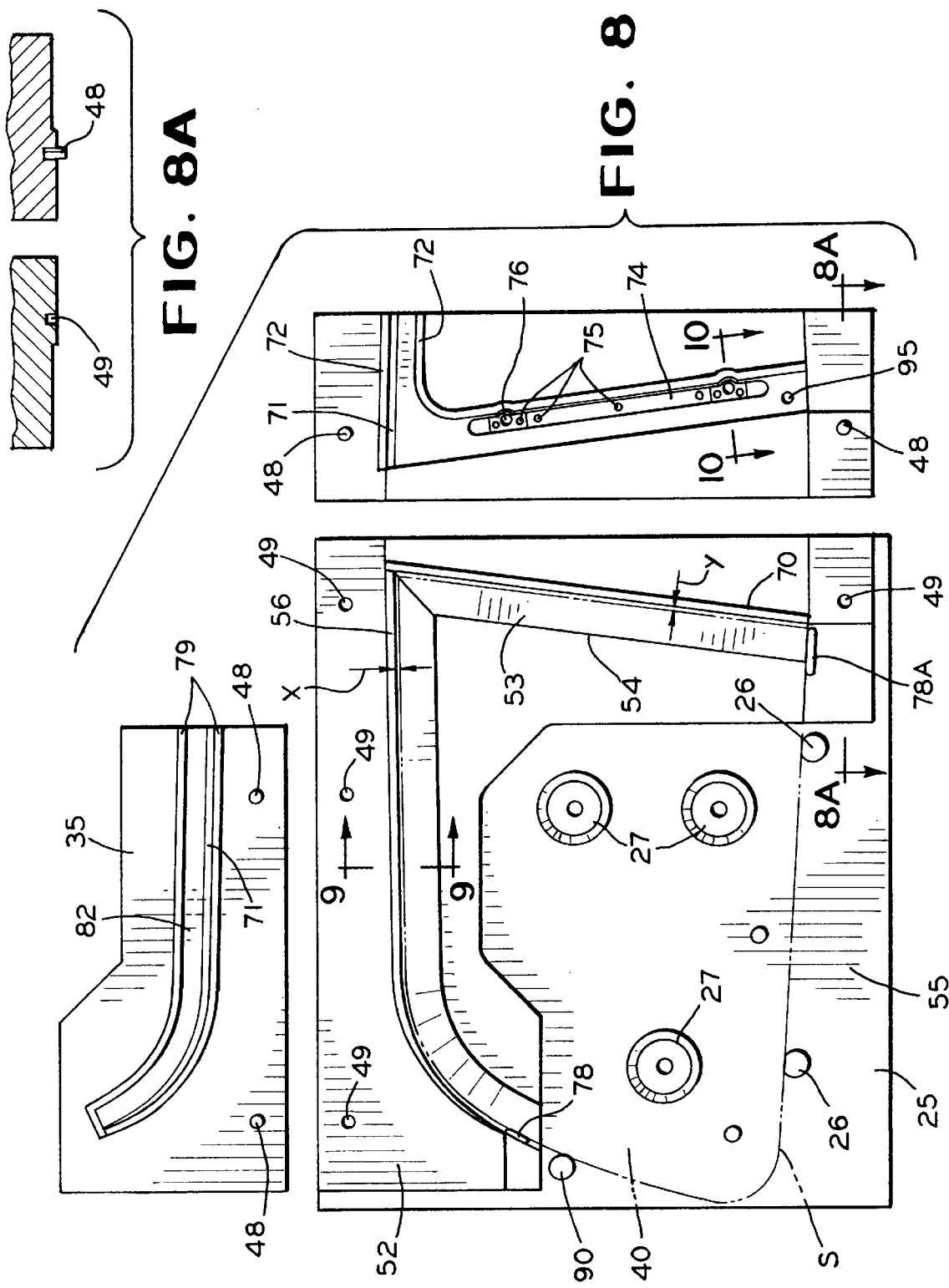

MOLDING APPARATUS FOR ENCAPSULATING A PART

RELATED APPLICATION

This application is claiming the benefit, under 35 U.S.C. §119(e), of the provisional application filed Aug. 2, 1996 under 35 U.S.C. §111(b), which was granted a serial number of 60/023,007, now abandoned. The provisional application, Serial No. 60/023,007, is hereby incorporated by reference in its' entirety.

BACKGROUND OF THE INVENTION

1. Field of the Invention

The present invention relates to a method and apparatus for molding. More particularly, the present invention relates to a method and apparatus for encapsulating all, or a portion, of a sheet of material and/or encapsulating structure on the surface thereof. Most particularly, the present invention relates to a method and apparatus for encapsulating all or part of a glass sheet for use as an automotive glazing. The scope of the present invention will be understood to cover the products made by the disclosed method and apparatus, as well as the particular mold structure described herein.

2. Description of the Prior Art

In the preferred embodiment of the present invention, the molding method and apparatus disclosed relate generally to glass sheets which are commonly employed as glazing closures in present day vehicles such as automobiles and the like. In addition to such glass sheets being bent to precisely defined curvatures dictated by the configuration and size of openings in the vehicle body, in order to meet strict quality standards of manufacturers, it is necessary to apply to the sheets of material items such as a gasket around a predetermined portion of the sheet of material, mounting brackets or studs at the location of the gasket, or at other positions on the surface of the sheet.

U.S. Pat. No. 4,561,625 discloses a mold structure for forming a polymeric gasket around a predetermined portion of a sheet of transparent material such as glass. The mold structure includes two cooperating mold sections for defining a chamber for receiving the transparent sheet. A seal is positioned about the periphery of the chamber and is utilized to resiliently support the sheet within the chamber. Also the seal cooperates with a predetermined portion of the transparent sheet for defining a gasket cavity having a configuration corresponding to the gasket to be formed on the sheet of transparent material.

U.S. Pat. No. 4,762,481 discloses a mold for forming a window assembly which includes a transparent glass sheet and gaskets formed by curing a polymeric gasket material in situ on the glass sheet to encapsulate a marginal peripheral edge portion thereof. A glass sheet to be utilized in a vehicle has a front edge, rear edge, and a lower edge to each of which is adhered such a gasket. In addition, a bracket means for attachment to a scissor linkage for raising and lowering the window can be secured to the lower edge of the window.

U.S. Pat. No. 4,584,155 discloses a method for molding surface structure onto the surface of a glass sheet.

While the above-mentioned patents show the forming of a gasket or encapsulation of the peripheral edge of a sheet of material, and the attachment of a bracket on the peripheral edge of a sheet of material, as well as molding onto the surface of the glass material of mold material, they do not show the attaching of a bracket onto the surface of the glass nor do they show a satisfactory apparatus for so doing. Thus, those skilled in the art continued to search for a solution of how to satisfactorily encapsulate a sheet of material while also encapsulating studs, brackets, and the like.

SUMMARY OF THE INVENTION

The aforementioned problems are addressed in accordance with the present invention by the utilization of a unique mold structure not heretofore found in the prior art, together with a novel method of using said mold structure. In its broadest form, the method and apparatus of the present invention may be used to mold almost any part which is currently injection molded. A portion of a mold cavity may be provided in a mold base, with at least one portion of a mold cavity being provided in at least one moveable mold core.

In one embodiment of the invention, the molding apparatus of the present invention is used to encapsulate a sheet of material, and includes a stationery mold base having a facing surface, a shaped surface, and slanted glass contacting surface, a shoulder portion, and a recess portion. Cooperating with the mold base is at least one movable mold core. Stop means and vacuum heads are provided in the stationary base to hold a sheet of material in proper relationship thereto such that all or a portion of the sheet of material will be encapsulated, with or without attachments, when one or more movable cores are positioned in a mating or facing relationship with said mold base.

In another embodiment of the invention, a moveable side core and a moveable top core, each having a portion of a mold cavity formed therein, will rotate into an opposed mating or facing relationship with a stationary mold base. The sheet of glass to be encapsulated will be interposed between the mold base and the cores, and may define and/or become part of the mold cavity. The portions of the glass surface and periphery on which a molding material will be deposited will be further defined by seal means. Provisions may be made in one or more of the cores to hold brackets, hinges or the like to be encapsulated either on the periphery, or the surface, of the sheet of material.

In a further embodiment of the present invention, a glass sheet having had a ceramic enamel band previously applied thereto is placed into a stationary mold base and held in place by retractable stops and vacuum heads. A moveable side core and a moveable top core, and associated seals, are rotated into position so that the facing surfaces of the mold will be adjacent and define a mold cavity. Polymeric or other molding material is introduced into the mold cavity defined thereby to encapsulate the top and side edges of the sheet of glass, as well as to apply and encapsulate a hinge onto the surface of the glass, if desired.

In a still further embodiment of the invention, a sheet of glass will be encapsulated on one surface only. A stationary mold base will have at least one slidable portion. A sheet of glass will be placed in position in the mold base, with the top and side cores open. The slidable portion of the mold base is closed. A seal in the slidable portion of the mold base will seal against a desired edge region of the glass sheet to prevent elastomeric material from molding on to, or encapsulating the edge region, the top and side cores will rotate to their closed position, and elastomeric material will be introduced into a mold cavity formed by the glass sheet and the top and side cores. After the molding process, the glass sheet will be removed, and will have encapsulation on one side or surface only.

Thus, one of the objects of the present invention is to provide a unique molding method and apparatus for injection molding a part.

Another object of the present invention is to provide a method and apparatus for encapsulating a sheet of material on one surface.

Another object of the present invention is to provide a method and apparatus for encapsulating a sheet of material on two surfaces.

Another object of the present invention is to provide an unique mold structure to provide for the encapsulation of a sheet of glass and accessories.

A further object of the present invention is to provide a part manufactured according to the foregoing method and apparatus which has one or more edges thereof encapsulated, and has a mounting bracket or hinge encapsulated proximate a surface thereof.

Further objects and advantages of this invention will be apparent from the following description and appended claims, reference made to the accompanying drawings forming a part of the specification, wherein like reference characters designate corresponding parts in the several views.

BRIEF DESCRIPTION OF THE DRAWINGS

FIG. 7 is a view similar in large part to FIG. 6, except showing the top core in its open position;

FIG. 8 is a diagrammatic view, similar in part to that shown in FIG. 4, but showing the top and side cores rotated a complete 180°;

FIG. 8A is a view, taken in the direction of the arrows, along the view line 8a—8a of FIG. 8;

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Figure 1:
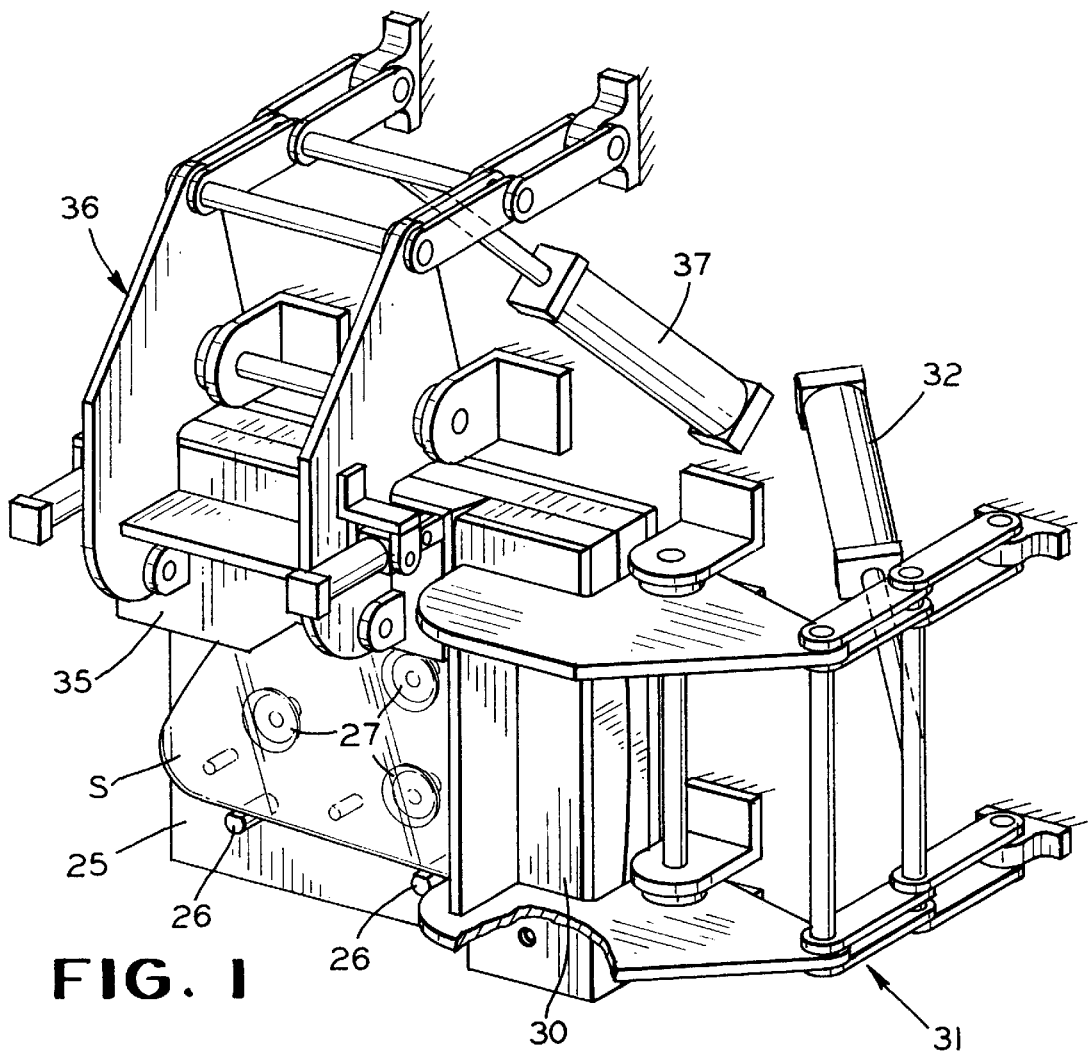
FIG. 1 is a diagrammatic perspective view of an apparatus embodying the present invention.

Referring now in detail to the illustrative embodiment depicted in the accompanying drawings, there is shown in FIG. 1 a frangible sheet S held in position in a stationary mold base 25 with the aid of stop means, such as stops 26, which may be retractable and/or adjustable, and one or more vacuum heads or other holding means 27.

A moveable side core 30 is shown in its closed or operative position in a mating relationship with the mold base 25. The moveable side core 30 may be opened or rotated by a first toggle means or mechanism, generally designated by the numeral 31, which is operated by the first or side fluid cylinder 32. More than one fluid cylinder may be used, if desired.

In a like manner, a moveable top core 35 is shown in its closed position in a mating, facing, or opposed relationship to the stationary mold base 25. As with the side core 30, the top core 35 may be opened or rotated from its closed to its open position by the second, or top, toggle means or mechanism, generally designated by the numeral 36, which is operated by the second or top fluid cylinder 37.

It is preferred that the top toggle mechanism 31 and the side toggle mechanism 36 be of a self-locking type. This permits the top fluid cylinder 37 and the side fluid cylinder 32 to be of an air operated type, instead of the hydraulically operated type commonly used in molding apparatus.

Figure 2:
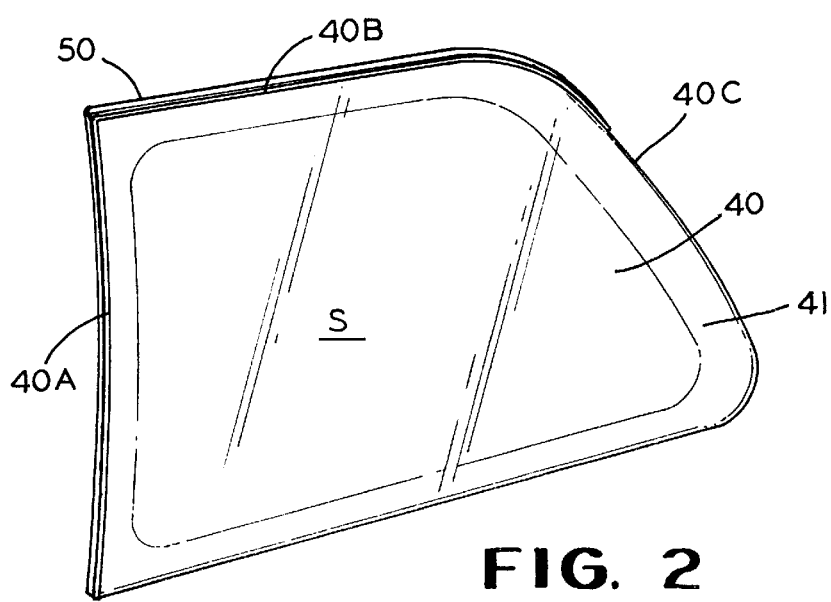
FIG. 2 is a perspective view of a part which may be manufactured according to the method of the present invention.

The sheet S may be such as the automotive vehicle side light 40, shown in FIG. 2 after the molding process. The sheet S will have normally have a ceramic enamel band 41 applied thereto before insertion into the mold base 25.

After the molding process takes place, in a manner to be described in detail below, the entire front edge 40A of the side light 40 is encapsulated, as is the entire top edge 40B. Only a portion of the rear edge 40C is encapsulated. Further features of the automotive side light 40 will be described in connection with FIG. 11.

Figure 3:
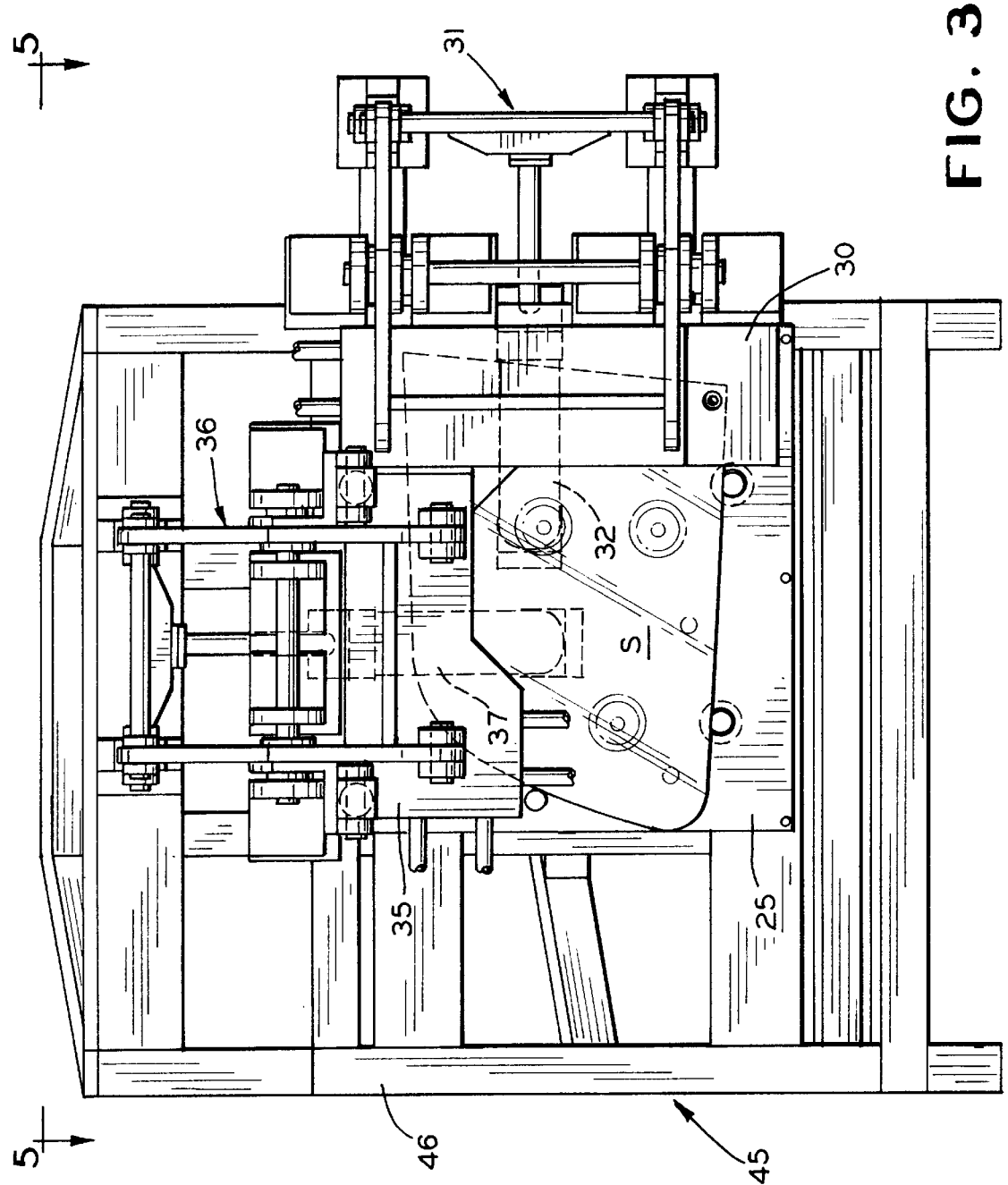
FIG. 3 is a front elevational view of the apparatus diagrammatically illustrated in FIG. 1.

Referring now to FIGS. 3–6, the apparatus of FIG. 1 is described in more detail. Referring specifically to FIG. 3 there is shown a mold station 45. The mold station 45 includes a frame 46, generally of a parallelepiped nature, to which stationary mold base 25 is fixedly mounted. The first or side toggle means, generally designated by the numeral 31, is mounted to one side of the frame 46 while the second or top toggle means, generally designated by the numeral 36, is mounted to the top of the frame 46. It can be seen that when the first fluid cylinder 32 is activated, the first or side toggle means 31 causes the moveable side core 30 to rotate away from the mold base 25. Likewise, when the second fluid cylinder 37 is activated, the moveable top core 35 rotates away from the mold base 25. Fluid supply means, and associated control means well known in the art, are used to operate the top toggle mechanism 36 and the side toggle mechanism 31, and need not be described in detail herein.

Figure 4:
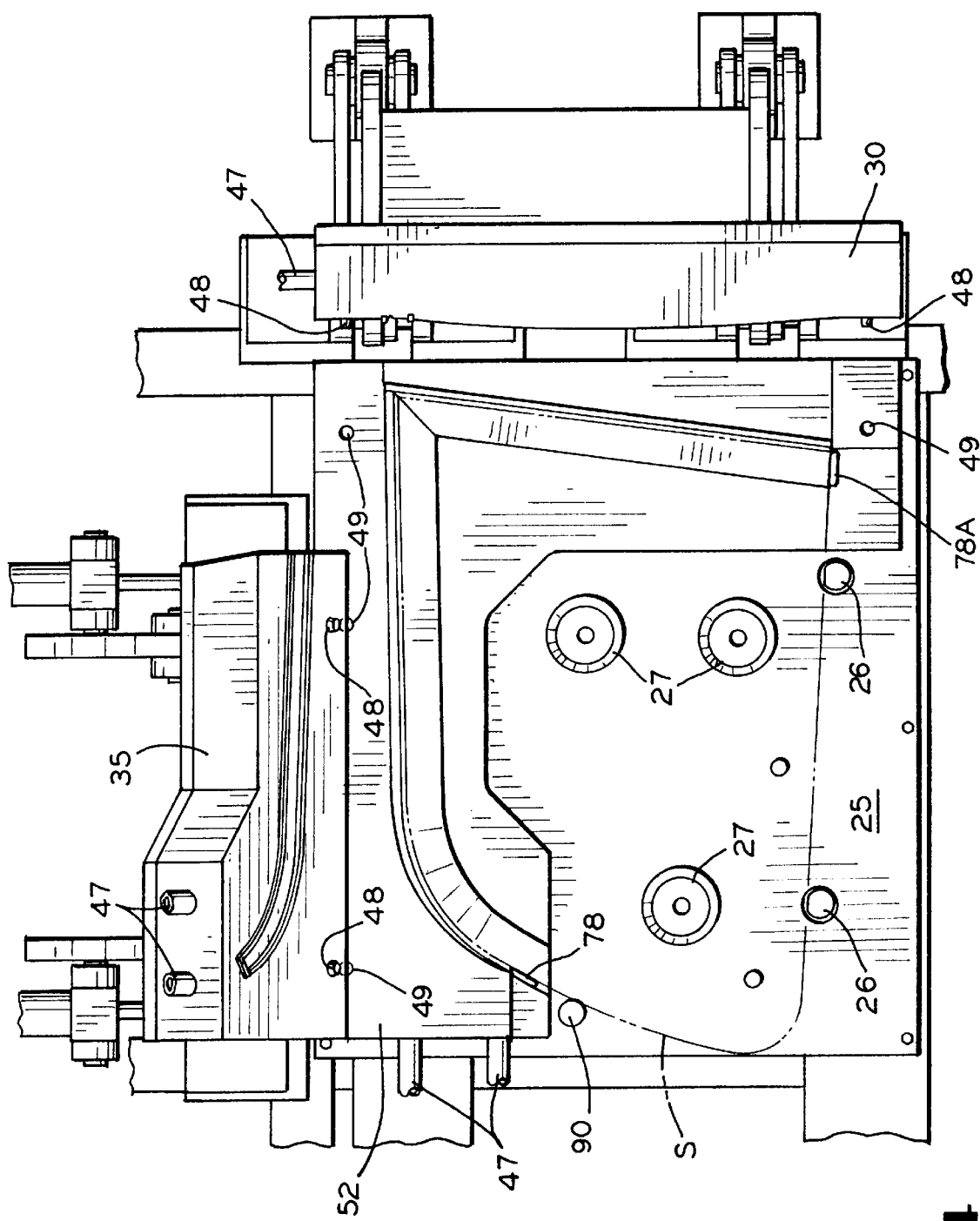
FIG. 4 is a view similar in part to that shown in FIG. 3, but illustrating the top and side mold cores in their open position.

FIG. 4 is a view similar in large part to FIG. 3, but showing the side core 30 and the top core 35 rotated to their open position by activation of the first toggle means 31 by the first fluid cylinder 32, and the second toggle means 35 by the second fluid activated cylinder 37. In FIG. 4 the vacuum heads 27 shown in FIG. 1 can clearly be seen, as can the retractable locator stops 26.

Depending on the molding or encapsulating material being used, it may be desirable to heat the mold base 25, the top core 35, or the side core 30. Conduits 47 may be provided for this purpose. To assure the proper location of the side core 30 and the top core 35 with respect to the mold base 25, locator pins 48 and corresponding locator pin holes 49 may be provided as desired.

Figure 5:
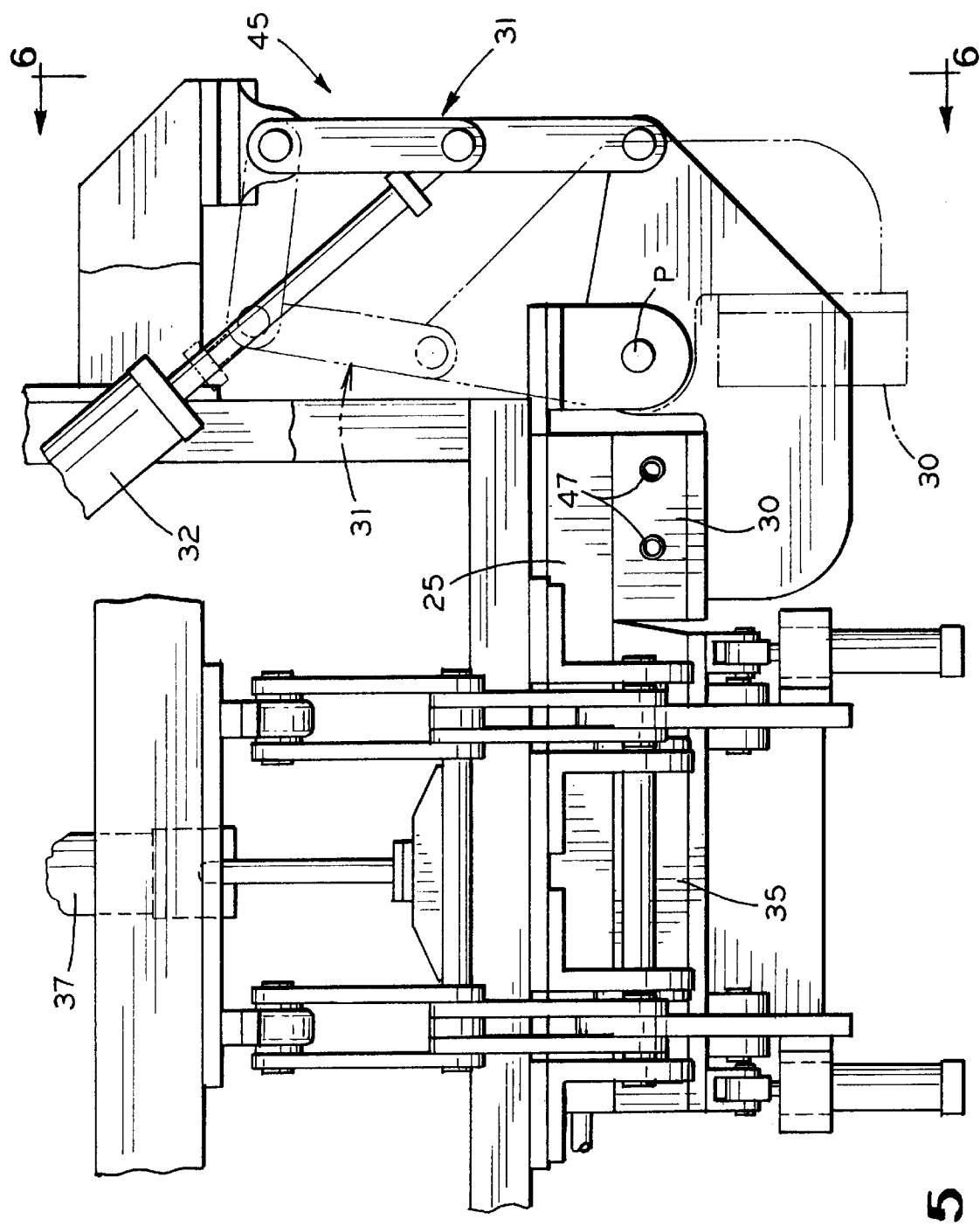
FIG. 5 is a view, taken in the direction of arrows, along the view line 5—5 of FIG. 3.

Referring to FIG. 5 the operation of the side core 30 is shown in more detail. The side cylinder 32, in its extended position as shown in solid lines, has the first toggle means 31 in its extended position. This causes the moveable side core 30 to be in a mating or facing relationship with the stationary mold base 25. However, as shown in phantom lines, when the side cylinder 32 is in its retracted position, the toggle 31 operates to rotate the side core 30 away from mold base 25, about pivot point P.

Figure 6:
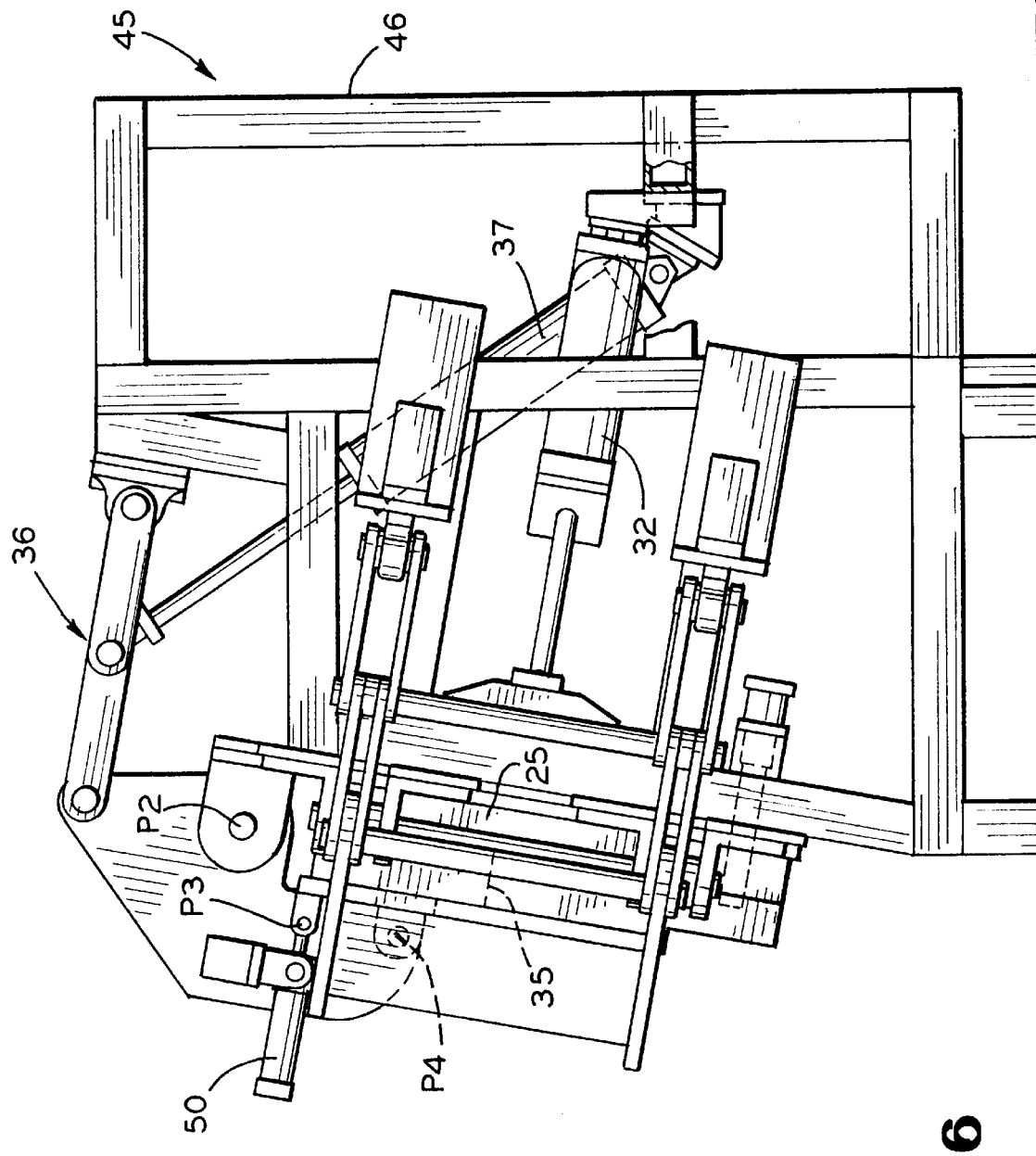
FIG. 6 is a view, taken in the direction of the arrows, along the view line 6—6 of FIG. 5.

Referring now to FIGS. 6 and 7, the operation of the top core 35 can be described in more detail. Top core 35, and second toggle means 36, are shown in their extended or closed position in FIG. 6 in heavy solid lines. In this position the top core 35 is in a mating relationship with the mold base 25. As shown in phantom lines in FIG. 7 however the operation of second fluid cylinder 37 and thus second toggle means 36 causes the moveable top core 35 to rotate about pivot point P2 away from stationary mold base 25. For additional clearance a third hydraulic cylinder 50 is attached at pivot point P3 to top core 35, and when operated causes top core 35 to pivot additionally about pivot point P4. The retractable stops 26 can be seen clearly in FIG. 7.

Figure 8B:
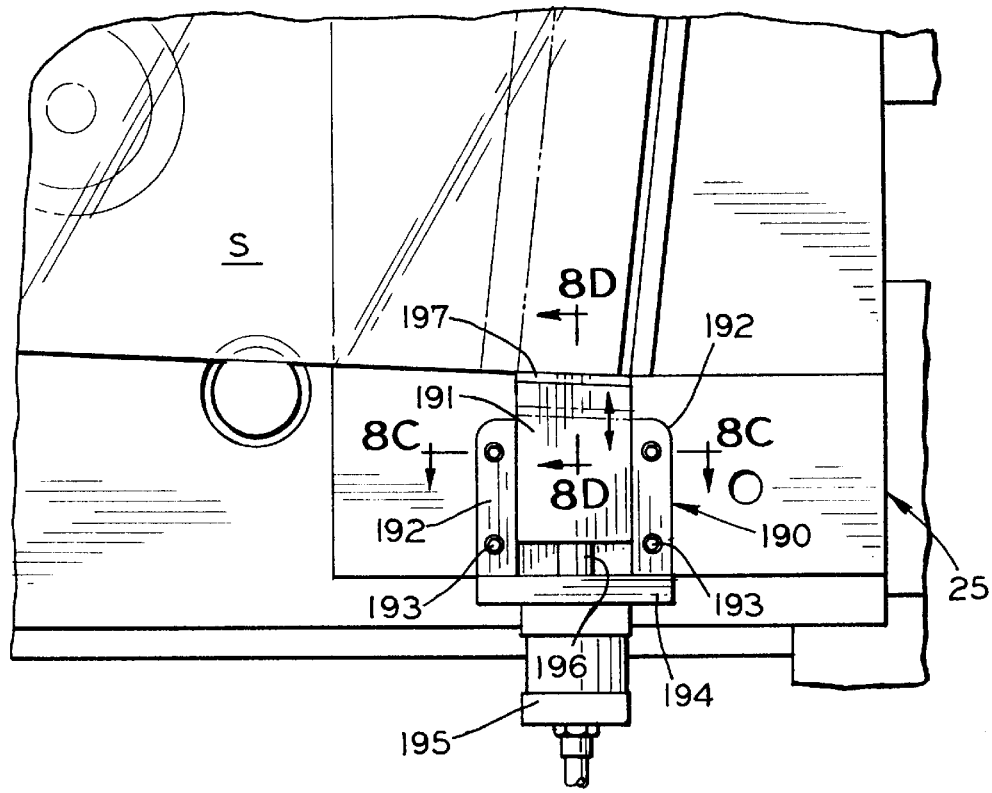
FIG. 8B is a fragmentary view similar in part to the construction shown in FIG. 8 but showing a movable dam.
Figure 8C:
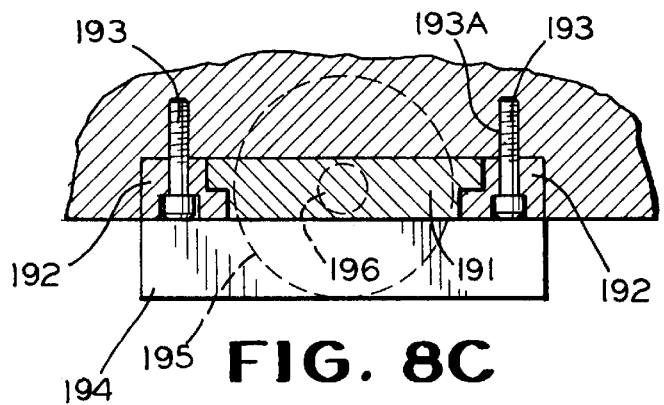
FIG. 8C is a sectional view, taken in the direction of the arrows, along the section line 8C—8C of FIG. 8B.
Figure 8D:
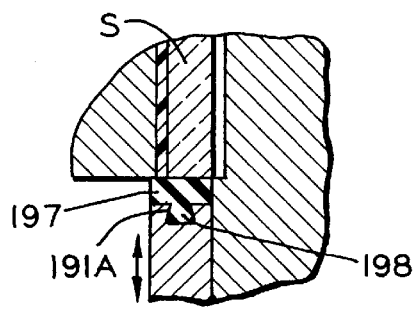
FIG. 8D is a sectional view, taken in the direction of the arrows, along the section line 8D—8D of FIG. 8B.
Figure 9:
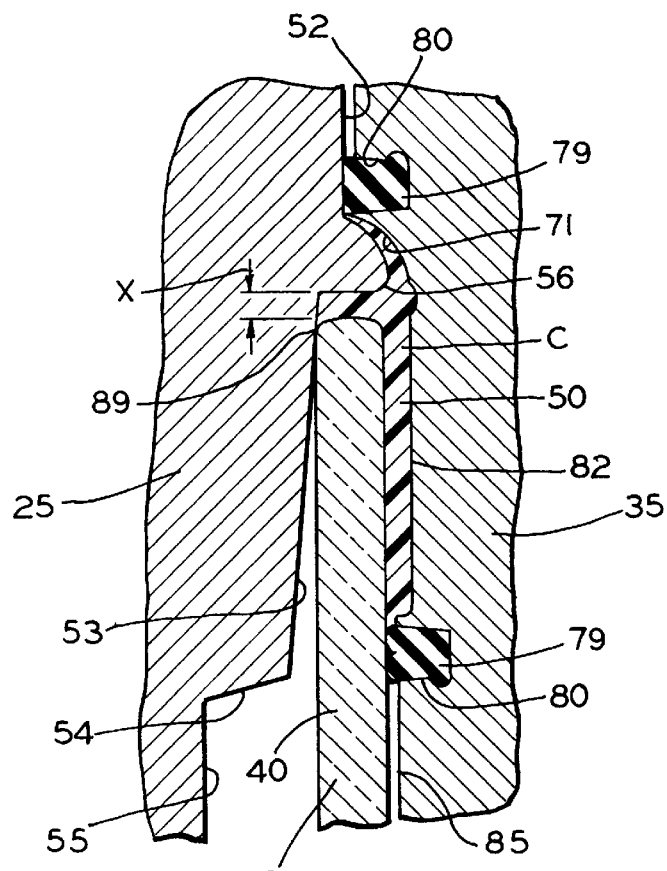
FIG. 9 is a sectional view, taken in the direction of the arrows, along the section line 9—9 of FIG. 8 when the mold is in its closed position.
Figure 10:
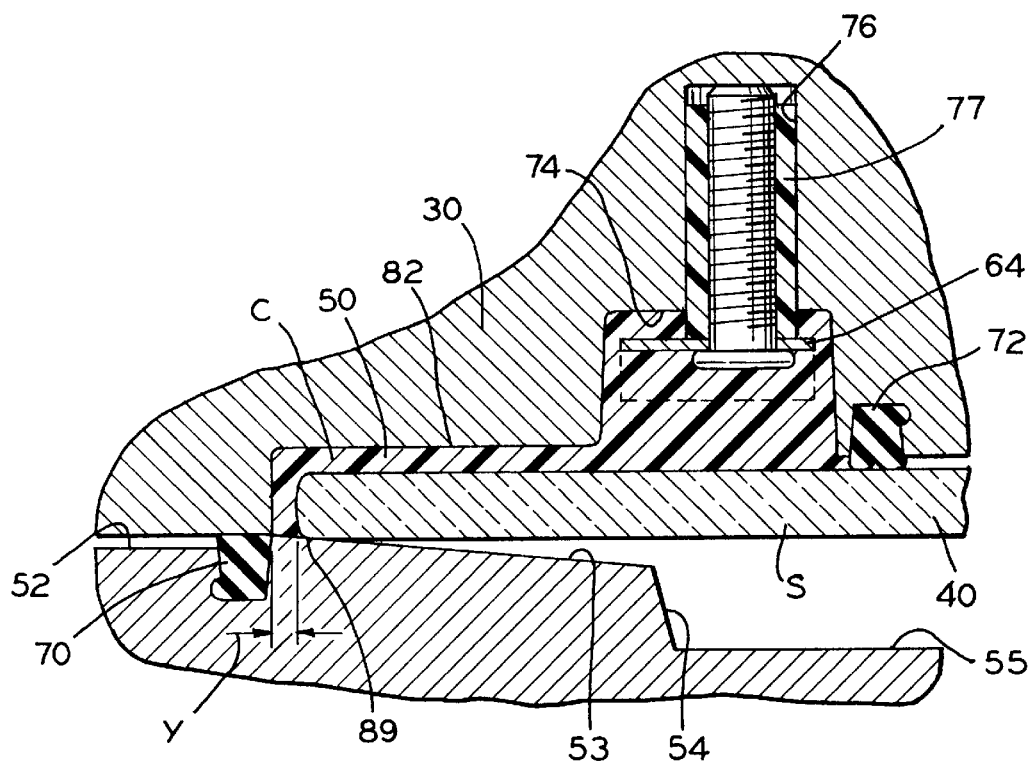
FIG. 10 is a sectional view, taken in the direction of the arrows, along the section line 10—10 of FIG. 8 when the mold is in its closed position.
Figure 11:
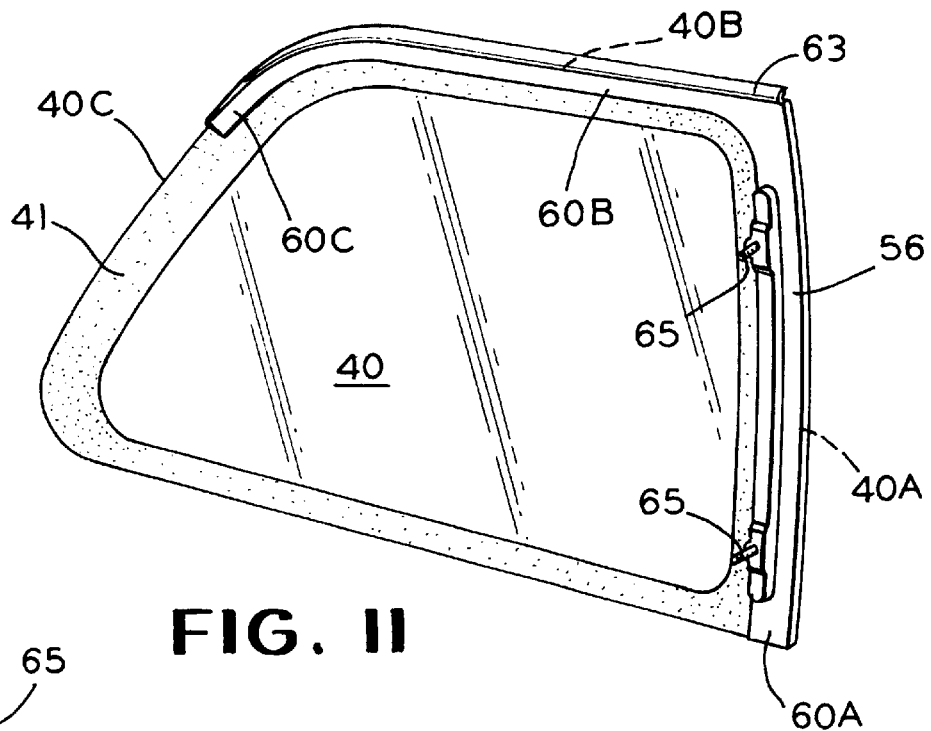
FIG. 11 is a rear perspective view of the part illustrated in FIG. 2.

Referring now to FIGS. 8–10, the details of the mold base 25 and mold cores (30,35) being used to produce the side light 40 can be clearly seen. First, referring to FIGS. 2 and 11, it can be seen that the side light 40 has a ceramic enamel band 41 to which a polymeric or other material 50 has been applied. The front edge 40A, the top edge 40B, and a portion of the rear edge 40C of the sheet S has been encapsulated. In addition, the polymeric or other material 50 has encapsulated the ceramic enamel band for a finite distance on the rear surface of the side light 40 along the front edge, top edge and a portion of the rear edge as shown at 60A, 60B and 60C (FIG. 11). Additionally, along the top edge 40B of the side light 41, immediately adjacent the surface molded portion 60B, there has been molded a gasket portion 63.

Additionally, a mounting bracket 64 has been encapsulated by the polymeric or other molding material on the rear of the side light 40 parallel to and a fixed distance from the front edge 40A of the side light 40. Only the threaded posts 65 protrude from the material 50 after the molding operation. The shape and extent of the mold cavity C, into which molding material 50 is introduced, is defined by the shape of the frangible sheet S, mold base 25, the side core 30, the top core 35, and sealing members mounted in recesses therein. The stationary mold base 25 has a first or facing surface 52, a second or slanted surface 53, a shoulder portion 54 and a recessed portion 55. In addition, to aide in forming a portion of the gasket 63 there is provided a material shaping surface 56 in a portion of the mold base 25. A mold cavity seal 70 is provided in the mold base 25 for the purposes to be described.

Referring to FIG. 9, in the top core 35 there is provided a first portion of a complemental material shaping surface 71 which will be in an opposed spaced relationship with a portion of the material shaping surface 56 when the top core is in its closed position. A pair of top core seals 79 are placed in recesses 80 in the top core 35.

Figure 12:
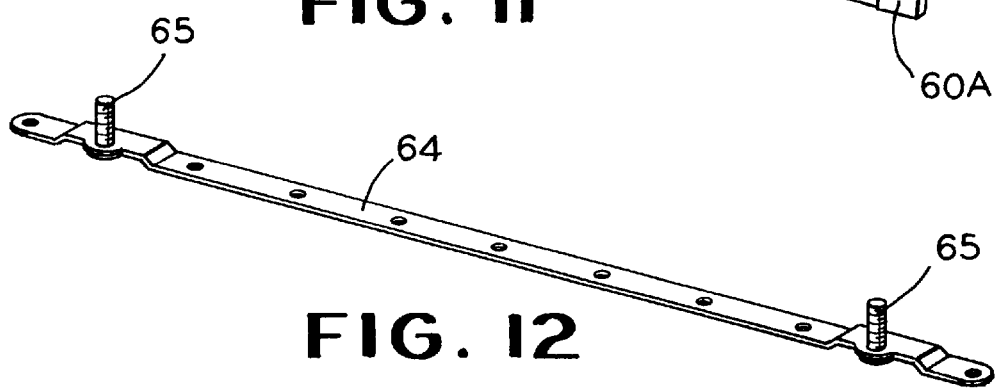
FIG. 12 is a perspective view of the hinge member encapsulated and shown in the construction illustrated in FIG. 11.

Referring to FIGS. 10–12, a bracket recess 74 is provided in the side core 30 to receive the mounting bracket 64. Magnets 75 (FIG. 8) hold the bracket 64 in position in the bracket recess 74. The mounting posts 65 extend into post recesses 76 which are of a larger diameter than the mounting posts 65 such that a plug 77 can surround the threads during the molding operation to insure that the polymeric or other molding material 50 does not plug the screw threads.

When the moveable top core 35 and the moveable side core 30 are both in their closed positions, the seals 79 form continuation of the seal 72 of the side core. It can be seen that when the cores (30,35) are in their closed position, in an opposed relationship with the stationary mold base 25, the mold cavity is C is defined by the shapes of the various surfaces of the mold previously described, the sheet of material S and the seals (70,72,79). A first dam 78, and a second dam 78A, complete the cavity C.

It has proven advantageous in some applications to make one, or both, of the dams stronger. Referring to FIGS. 8, 8B, 8C, and 8D, it can be seen that one of the dams 78A shown in FIG. 8 has been replaced with the moveable dam assembly 190. Dam assembly 190 includes a ram 191 which is moveable reciprocally in guide rails 192. Guide rails 192 are mounted to the mold base 25 by any suitable fastening means, such as screws 193 and tapped holes 193A.

Bracket 194 is fixedly mounted to guide rails 192. Fluid cylinder 195, having piston rod 196 connected to ram 191 for reciprocating movement, is mounted to bracket 194. Fluid cylinder 195 is operated by any of the means well known in the art to reciprocate the ram 191.

There is provided in the ram 191 a seal mounting groove 191A. Seal mounting groove 191A accepts a tongue portion 198 of dam 197. By the use of this construction, the dam 197 may be larger and stronger than the dam 78 which it replaces.

The mold cavity C need not remain of constant cross-section but as can be seen in FIG. 10 will vary in cross-section and be defined differently. In this instance, the mold base seal 70 will press against the mold surface 82 to define one extent of the cavity, while the seal 73 will press against the sheet of material S to define the other extent of the cavity.

It can be seen in FIG. 9 that the glass sheet S is spaced a distance X from the edge of the material shaping surface 56, and thus defines a portion of the mold cavity C. This distance provides the molding material 50 the opportunity to encapsulate the edge of the sheet S, including extending around the curvature of the edge until the flow of material is stopped by the glass to steel, or line to surface, contact indicated at the point 89. Referring to FIG. 10 it can be seen that the glass sheet S is spaced, in this instance a distance Y from the edge of the mold base seal 70, thus defining another portion of mold cavity C.

Referring to FIG. 4, the distance X is fixed by the positioning of the retractable stops 26 and the fixed stop 90. It is preferable that the distances X and Y be equal and uniform along the entire perimeter being encapsulated. However, it has been found that the distance is fixed only at the point X, and because of manufacturing tolerances, the distance Y may vary somewhat.

It can be understood that because the under side of the sheet S is supported in the stationary mold base 25 by the line to surface contact shown at point 89, the pressure applied to the glass sheet by the molding material 50 when injected into the mold, and the seals 70, 73 and 79, should be such as not to cause the glass or material to break. The particular pressure which can be applied will be determined by the material of which the sheet S is made and the area of the mold cavity C. Just as a wide variety of materials may be used for the sheet S, a wide variety of molding materials may be used in the method of the present invention. Such materials include polyvinyl chloride, butyrate, isocyonate and polyol.

Referring to FIG. 4, according to the method of the present invention, the moveable side core 30 and the moveable top core 35 will initially be in their open position, and a sheet of material S will be loaded into the mold base 25, either manually or automatically. The sheet S will be located on the retractable stops 26, which will initially be in an extended position, and the fixed stop 90. The side core 30 and the top core 35 will then be closed so that the seals 71, 73 and 79, the dams 78,78A, together with the surfaces of the mold base 25, the side core 30, and the top core 35, will define a mold cavity C. A molding material 50 will be injected into the cavity through the mold sprue or opening 95 (FIG. 8).

Whether the preferred reaction injecting molding process is being used, or another suitable molding process, the side core and top core will remain closed for a suitable curing time, after which they will be opened. The retractable stops 26 will be retracted, and manual or automatic means will be used to remove the sheet of material S after the vacuum heads 27 have released the sheet S. The molding process and the opening and closing of the side and top cores will be controlled by means well known in the art. Either hydraulic, pneumatic, or other suitable means may be used to accomplish the control functions.

Figure 13:
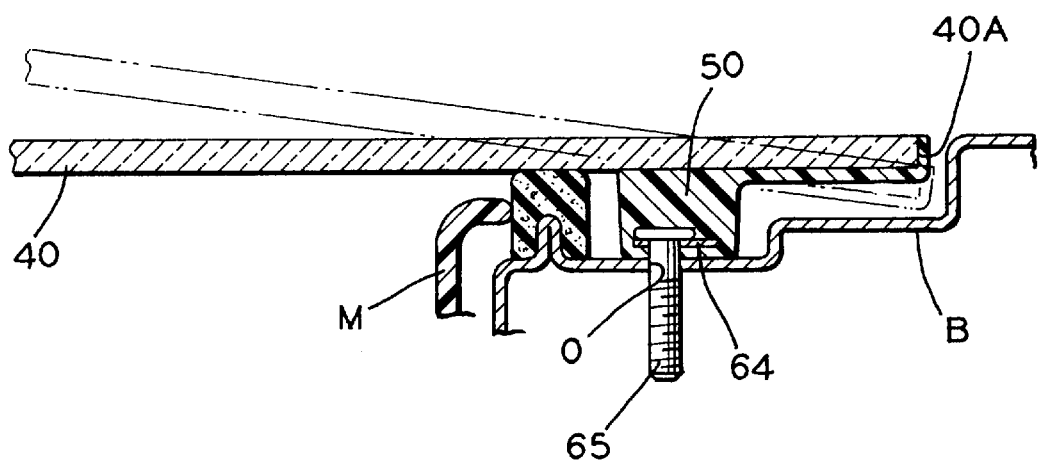
FIG. 13 is a partial sectional view showing the mounting of the construction of FIG. 11 to an automotive vehicle body.

Referring to FIG. 13 the side light of FIG. 11, manufactured according to the method of the present invention, is installed in the body B of an automotive vehicle. The bracket 64 with mounting post 65 has been encapsulated by the molding material 50 on the side light 40. The mounting post(s) have been inserted through an opening(s) O in the body B. Suitable fasteners will retain the mounting posts, and thus the side light 40, in the automotive body B. Molding M commonly found in automotive vehicles may cover some of the attaching structure.

The embodiment of the invention described thus far has shown two sided encapsulation of a part, i.e., a bottom, or inner, surface of a part, together with a side edge or edges. It can easily be understood that the present invention can also accomplish two-sided encapsulation by encapsulating the top, or outer surface of a piece of glass, together with the side edge or edges.

Figure 14:
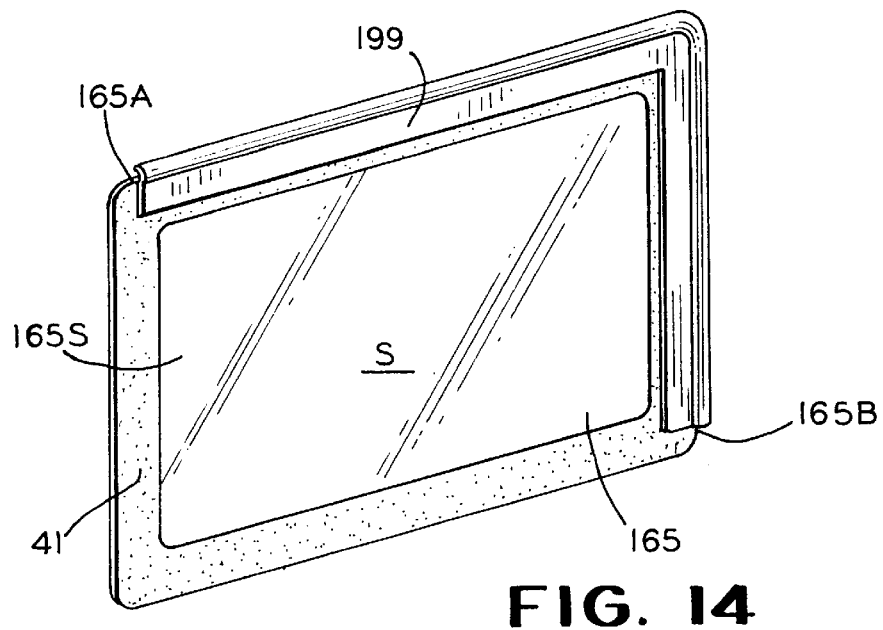
FIG. 14 is a perspective view of another part which may be manufactured according to the method of the present invention.

A modification of the present molding method and apparatus can be used for one sided encapsulation, i.e., molding onto a top or bottom surface of a part only. Such a part may be the sheet S as shown in FIG. 14 after the molding process, with the gasket 199 applied to surface 165S. The sheet S will normally have a ceramic enamel band 41 applied thereto before insertion into the multi-part mold base 160. After the molding process takes place, in a manner to be described in detail below, none of the edges of the glass are encapsulated. This is in contrast to the construction shown in FIG. 2. The sheet S, which may be such as automotive glass 165, is encapsulated on its bottom or inner surface 165S proximate its top edge 165A and one side edge 165B.

Referring now to FIGS. 15–18 the modification of the present invention used to produce the part of FIG. 14 with single sided encapsulation is shown. A multi-part mold base 160 has a stationary base portion 161, a first slidable portion 162, and a second slidable portion 163.

Figure 17:
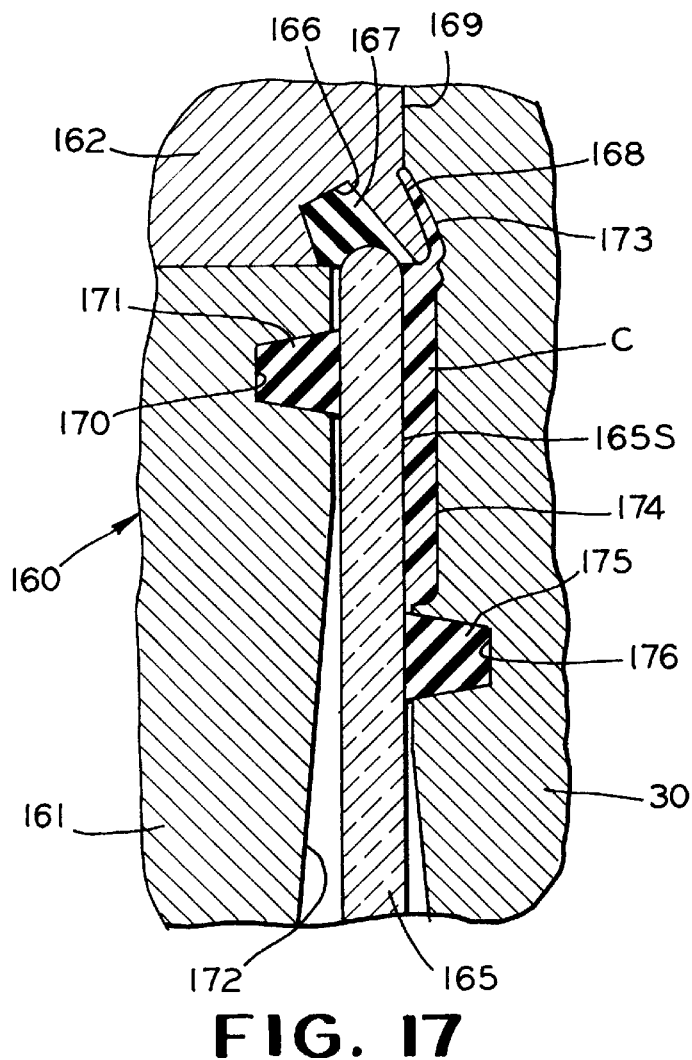
FIG. 17 is a sectional view, taken in the direction of the arrows, along the section line 17—17 of FIG. 15.

The first slidable portion 162 and the second slidable portion 163, when in their closed position, as shown in FIG. 17, contact the stationary portion 161. A side seal groove 166 is provided in first slidable portion 162 and second slidable portion 163 proximate the inner perimeter thereof. Side seal gaskets 167 are mounted in side seal grooves 166.

Also provided proximate the inner perimeter on the first slidable portion 162 and the second slidable portion 163 is a material shaping surface 168, and a facing surface 169, in a manner, and for purposes similar to those previously described in connection with two-sided or two surface encapsulation.

Provided in the stationary portion 161 of the multi-part mold base 160 is gasket groove 170. Support gasket 171 is provided in gasket groove 170. Slanted portion 172 completes the fixed portion 161 of the mold base 160.

Referring to FIG. 17, the moveable side core 30 has a complemental material shaping surface 173 and a cavity surface 174. A cavity seal 175 is provided in cavity seal groove 176. The mold cavity C is formed by the glass surface 165S, a portion of the side seal 166, the material shaping surface 168, the complemental material shaping surface 173, cavity surface 174 and the cavity seal 175.

The top core 35 will have similar surfaces and seals. In contrast to the previously described embodiment of the invention, in the single sided encapsulation embodiment, the glass sheet S does not contact the surface of the mold base directly at any point, nor does the stationary base portion 161 form any part of the mold cavity C.

Figure 16:
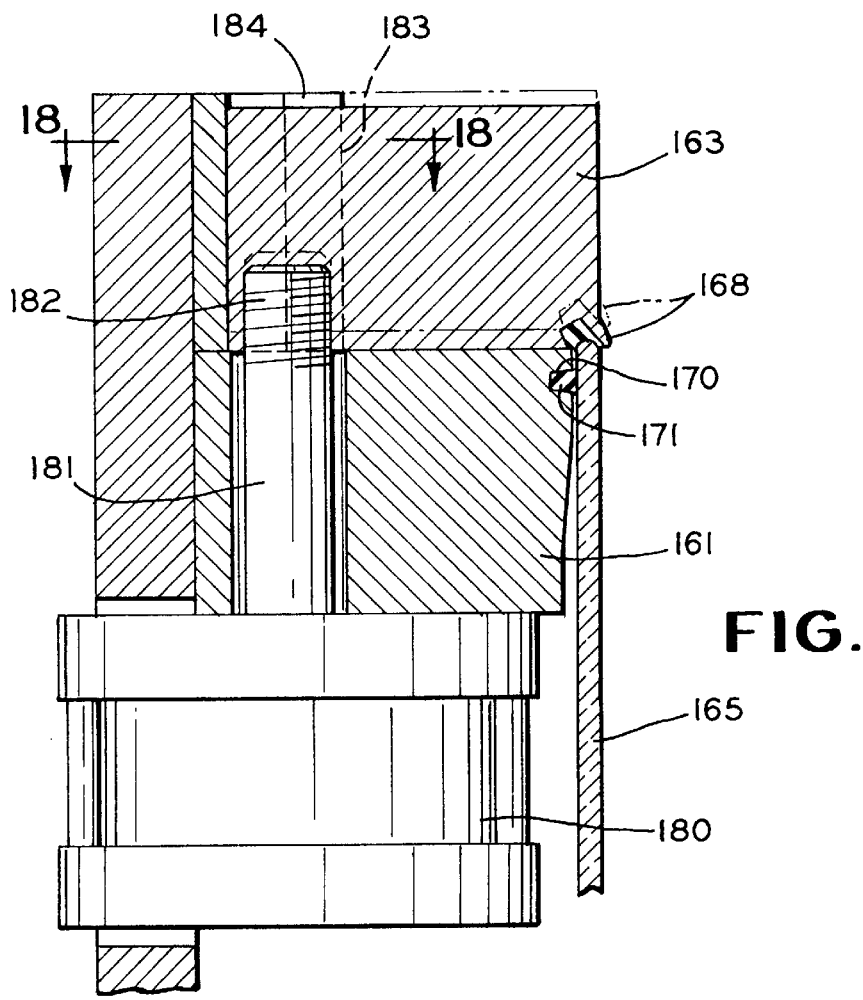
FIG. 16 is a sectional view, taken in the direction of the arrows, along the section line 16—16 of FIG. 15.
Figure 15:
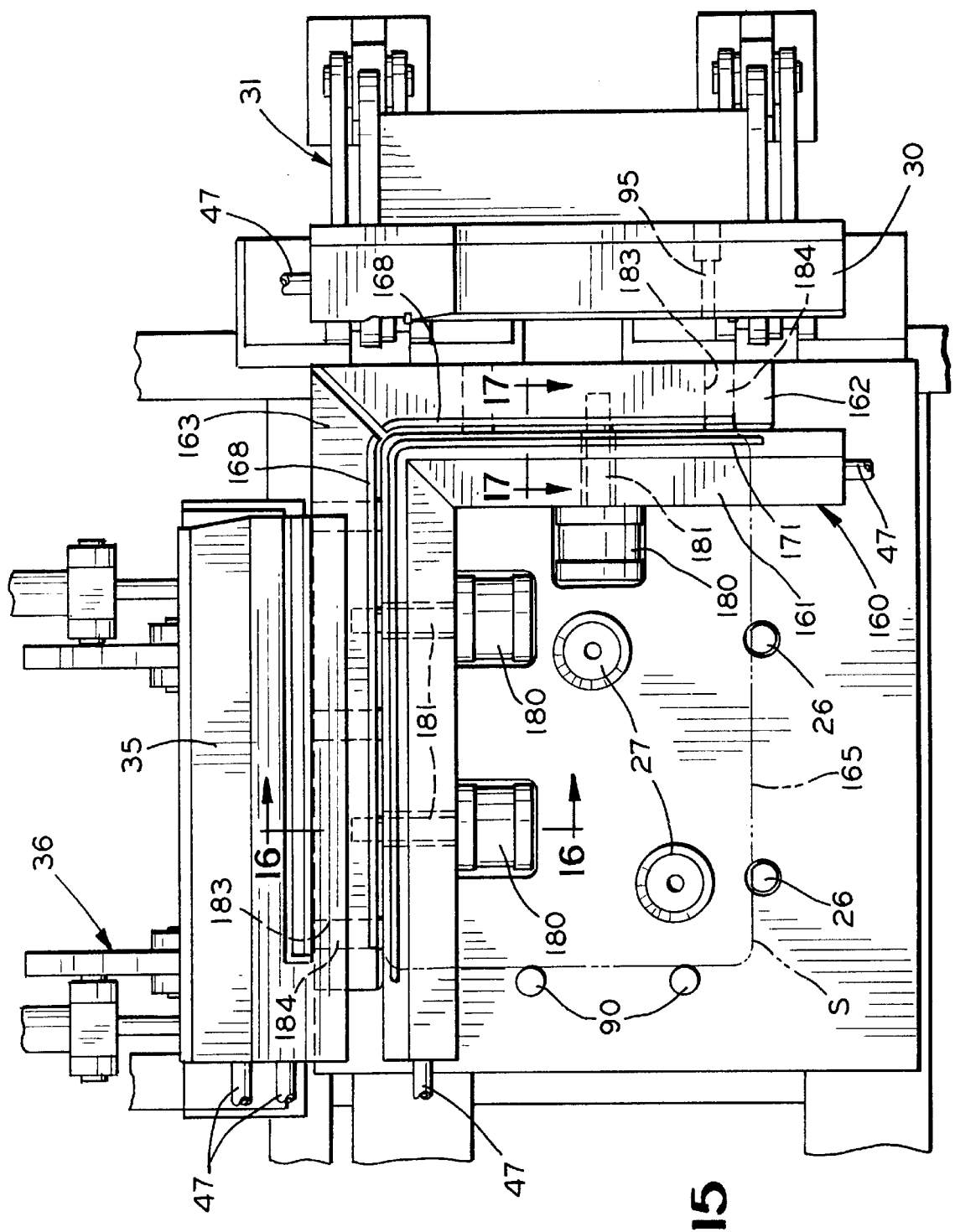
FIG. 15 is a modification of the apparatus shown in FIG. 4 which is used to manufacture the part shown in FIG. 14.
Figure 18:
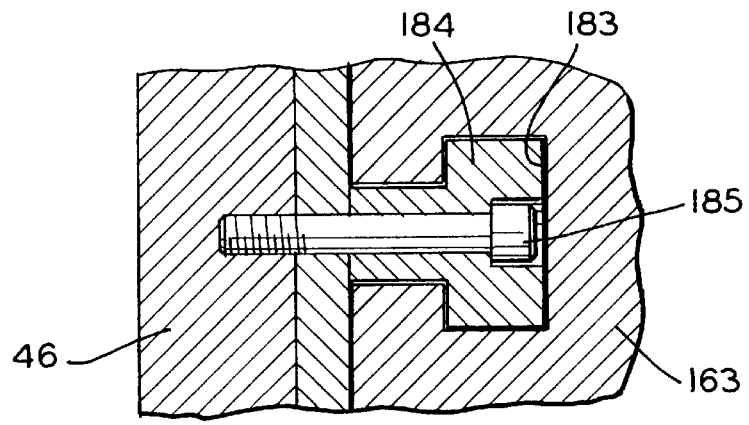
FIG. 18 is a sectional view, taken in the direction of the arrows, along the section line 18—18 of FIG. 16.

Referring to FIGS. 15 and 16, the first slidable portion 162 and the second slidable portion 163 of the multi-part mold base 160 are moved into, and out of, contact with the stationary portion 161 by the fluid operated slide cylinders 180. Each fluid operated slide cylinder has a piston rod 181 associated therewith. Each piston rod has a threaded portion 182 which is connected to one of the slidable portions (162,163).

Each of the slidable portions 162,163 has at least one, and preferable two T-shaped recessed portions 183 which ride on complementary T-shaped rails 184. Fastening means 185 connect the rails 184 to the frame 46.

In accordance with the method used for one-sided encapsulation, the first slidable portion 162 and the second slidable portion 163 of the multi-part mold base 160 are initially open or out of contact with the stationary portion 161. The sheet S is loaded into the mold base 160 with the aid of stops 26 and 90, as well as vacuum heads 27, in a manner similar to that previously described. The slidable cores 162,163 are brought into contact with the stationary portion 161 of the mold base 160, the top core 35 and side core 30 are closed, and the elastomeric material is introduced into the mold cavity C. As described previously, after a suitable curing time, the top core 35 and side core 30 are opened, and the sheet S is removed, having been encapsulated on one side or surface only. As before, parts such as hinges, etc. may also be molded on to the surface of the sheet during the encapsulation process.

The operation of the top core 35 and the side core 30 are substantially identical to that described above. As before, a top toggle mechanism 36, operated by a top fluid cylinder (not shown) opens and closes the moveable top core 35 by rotating it around a suitable pivot point in accordance with the program contained in the control means of the present invention.

In a similar manner the side fluid cylinder (not shown) opens and closes the moveable side core 30 by rotating it about a suitable pivot point. Although for purposes of illustration and ease of understanding, the top and side cores 35,30 in both embodiments of the invention illustrated have been shown rotated 180°, in practice, this is seldom necessary.

As before, the polymeric material will enter the mold cavity through the sprue 95 and the top core 35 and the side core 30 will be heated or cooled as desired through the conduits 47. The automotive glass 165 as before will held against the split mold base 160 by the vacuum heads 27.

Figure 19:
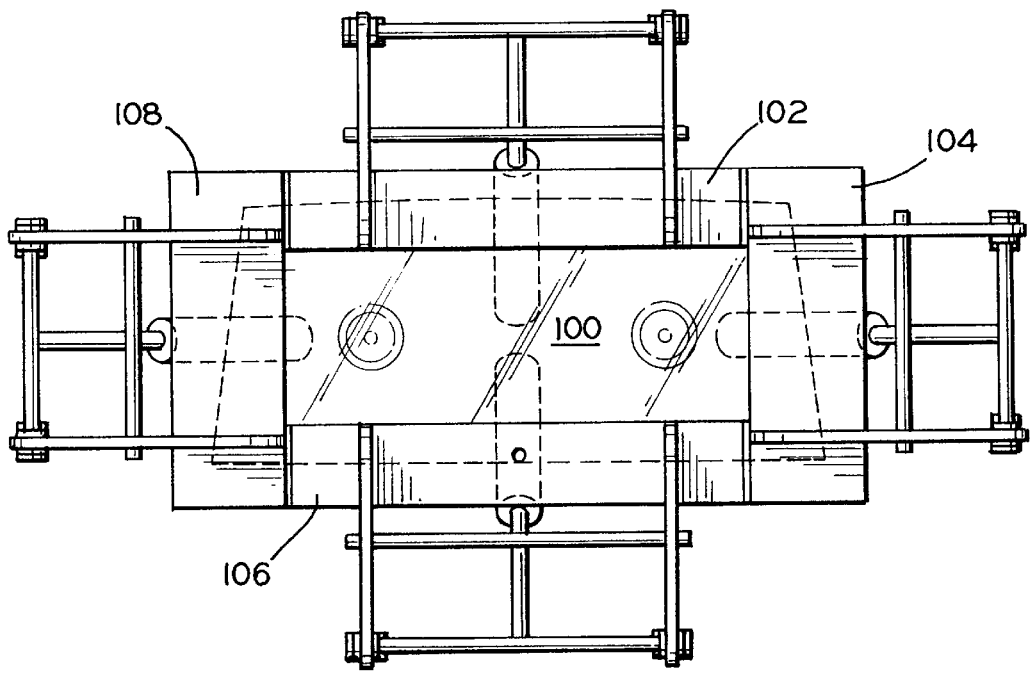
FIG. 19 is a diagrammatic view illustrating that a number of movable mold cores may be used in connection with the mold cavity.

As illustrated by FIG. 19, the foregoing embodiments have been illustrative only. As shown in FIG. 19, the mold base 100 can have any practical number of top (102,106) or side (104,108) cores to perform practically any encapsulation operation on a sheet of material S. The apparatus shown in FIG. 14 has a top core 102, a right side core 104, a bottom core 106 and a left side core 108 operated by suitable means as previously described to encapsulate sheet S.

Figure 20:
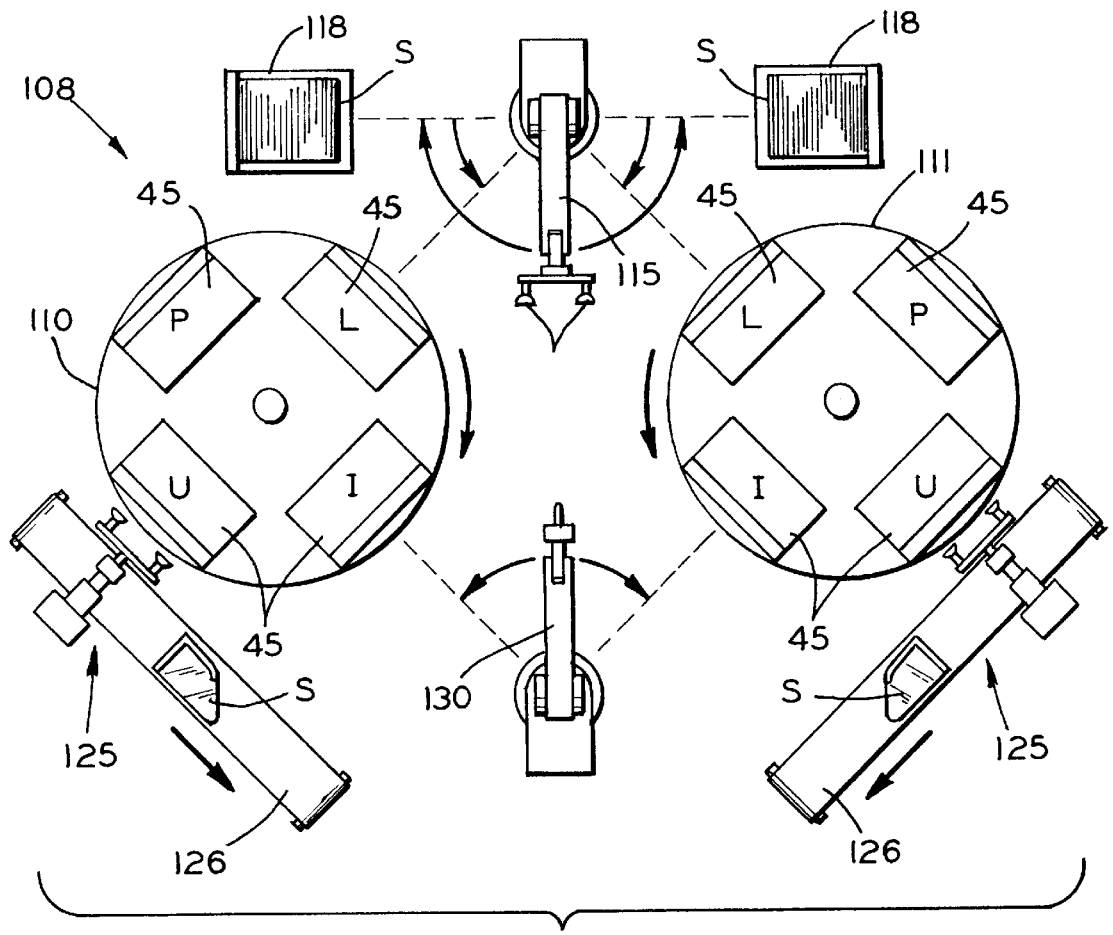
FIG. 20 is a top plan view of a manufacturing system embodying the construction of the present invention.

There is shown in FIG. 20 a complete manufacturing system 108 utilizing the method of the present invention. The manufacturing system according to FIG. 15 has a first turntable 110 and a second turntable 111. These turntables may be identical, and may turn in the same or opposed directions. In the illustrative embodiment of FIG. 20, the first turntable 110 turns clockwise, and the second turntable 111 turns counterclockwise. Each turntable will have a plurality, preferably four, of the mold stations 45 previously described. Each individual mold station may be designed for identical or different parts. For example, if each turn table (110,111) has four mold stations, from one to eight different parts may be produced on the manufacturing system shown.

In the manufacturing system 108 being illustrated there is also provided a robotic loading arm 115, which may extend as desired, and has suction means 116 at the end thereof to automatically pick up sheets alternately from racks 118 and load them in to the mold stations 45. Depending upon the number of the different parts being made, more or less than two of the racks 118 may be provided.

After a sheet S is moved from rack 118 by the robotic loading arm 115, and loaded in the loading station L as previously described, the top core 35 will close and the turn table 110 will index to the injection station I. At the injection station the side core closes and the reaction injecting molding process begins. After the injection process is complete the retractable stops 26 will retract to avoid interference, the sheet of material S being held in place by the vacuum heads 27.

The turn table 110 next indexes to an unloading station where an unloading apparatus, generally designated by the numeral 125, will unload the now encapsulated sheet S, and place the same on a conveyor 126 for further processing. The turntable next indexes to the priming station P where the mold is primed to receive a new sheet S. The next indexing will bring station 45 in position to receive new sheet S, and the molding process will be repeated.

As the clockwise rotating turn table 110 is undergoing this series of operations, the counterclockwise rotating turn table 111 is undergoing a similar series of operations, but in a timing sequence which allows the robotic arm 115 and the injecting arm 130 to serve both turn tables.

Thus, by carefully analyzing the problems presented when it is attempted to encapsulate a sheet of material, a novel method and apparatus has been produced, as well as a novel product.

What is claimed is:

1. An apparatus for encapsulating a sheet of glass including:
   a) a frame member,
   b) a stationary mold base mounted to said frame member and having at least a portion of a mold cavity therein,
   c) a movable top mold core having at least a portion of a mold cavity formed therein, and rotatable about a fixed pivot point between a closed position in a facing relationship with said stationary mold base, and an open position rotated away from said mold base, said portion of said mold cavity in said movable top mold core being adjacent said portion of said mold cavity in said stationary mold base when said movable top mold core is in its closed position,
   d) a movable side mold core having at least a portion of a mold cavity formed therein and moveable between a closed position in a facing relationship with said stationary mold base, and an open position rotated away from said mold base, said portion of said mold cavity in said movable side mold core being adjacent said portion of said mold cavity in both said mold base and said moveable top mold core when said movable side mold core is in its closed position, and at least a portion of said sheet of glass to be encapsulated being contained in the mold cavity formed by said stationary mold base, said moveable top mold core, and said moveable side mold core,
   e) means to rotate said movable top mold core between its open and its closed position,
   f) means to rotate said movable side mold core between its open and its closed position,
   g) means to introduce molding material into the mold cavity formed when said movable mold core is in its closed position, and
   h) control means to control said means to rotate and said means to introduce.

2. The apparatus defined in claim 1, wherein
   a) said means to rotate said moveable top mold core between its open and its closed position include a top toggle means mounted to said frame member and connected to said moveable top mold core.

3. The apparatus defined in claim 2, wherein
   a) a said means to rotate said top mold core further include a second fluid cylinder connected to said top toggle means to cause said top core to rotate away from said stationary mold base when said second fluid cylinder is retracted.

4. The apparatus defined in claim 3, and further including fluid supply means in fluid communication with said second fluid cylinder.

5. The apparatus defined in claim 4, wherein said means to rotate said moveable side mold core include side toggle means mounted to said frame member and connected to said moveable side mold core.

6. The apparatus defined in claim 5, wherein said means to rotate said moveable side mold core further include a fluid cylinder connected to said side toggle means to rotate said moveable side mold core when said first fluid cylinder is retracted.

7. The apparatus defined in claim 6, and further including fluid supply means connected to said first fluid cylinder.

8. The apparatus defined in claim 7, wherein said means to introduce molding material into said mold cavity include a sprue formed in said moveable side core.

9. The apparatus defined in claim 8, wherein said stationary mold base includes vacuum heads to hold said sheet of glass in position in said stationary mold base and allow at least a portion of said sheet of glass to be contained in the mold cavity formed by the stationary mold base, said moveable top core, and said moveable side core.

10. The apparatus defined in claim 9, and including retractable stop means to aid in positioning said sheet of glass in said stationary mold base.

11. The apparatus defined in claim 10, wherein said moveable top mold core includes
   a) a pair of recesses,
   b) a seal contained in each of said recesses,
   c) a first portion of a material shaping surface, and a mold cavity surface, said first portion of a material shaping surface and said mold cavity surface extending between said seals contained in said pair of recesses.

12. The apparatus defined in claim 11, wherein said portion of said cavity formed in said moveable side core includes
   a) a mold cavity surface,
   b) a bracket recess,
   c) a post recess, and
   d) a seal.

13. The apparatus defined in claim 12, wherein said stationary mold base includes
   a) a slanted surface,
   b) a shoulder portion, and
   c) a recess portion, said sheet of glass to be encapsulated and being contained in said mold cavity having line to surface contact with said slanted surface of said stationary mold base.

14. The apparatus defined in claim 13, wherein said stationary mold base includes:
   a) a first dam cooperating with said pair of seals in said top mold core, when said top mold core is closed, to define a portion of the said mold cavity.

15. The apparatus defined in claim 14, wherein said stationary mold base contains a second dam cooperating with said moveable side mold core to define a portion of said mold cavity when said moveable side mold core is closed.

16. The apparatus defined in claim 15, wherein said stationary mold base includes a fixed stop to help position said sheet of glass to be encapsulated on said stationary mold base.

17. An apparatus for encapsulating a sheet of glass including:
   a) a frame member,
   b) a multi-part mold base mounted to said frame member,
   c) a moveable top mold core having a portion of a mold cavity formed therein and moveable between a closed position in a facing relationship with said multi-part mold base, and an open position rotated away from said mold base, said portion of said mold cavity in said top moveable mold core being adjacent said multi-part mold base when said at least one moveable mold core is in its closed position, and at least a portion of said sheet of glass to be encapsulated being between said stationary mold base and said moveable mold base, and forming a part of said mold cavity,
   d) a moveable side mold core having a portion of a mold cavity formed therein and moveable between a closed position in a facing relationship with said multi-part mold base, and an open position rotated away from said mold base, said portion of said mold cavity in said side moveable mold core being adjacent said multi-part mold base and the portion of said mold cavity formed in said moveable top mold core when said moveable side mold core is in its closed position, and at least a portion of said sheet of glass to be encapsulated being between said stationary mold base and said moveable mold base, and forming a part of said mold cavity,
   e) means to rotate said moveable top mold core between its open and its closed position,
   f) means to rotate said moveable side mold core between its open and its closed position,
   g) means to introduce molding material into the mold cavity formed when said moveable top and side mold cores are in their closed position, and
   h) control means to control said means to rotate and said means to introduce.

18. The apparatus defined in claim 17, wherein said multi-part mold base includes:
   a) a stationary base portion,
   b) a first slidable portion, and
   c) a second slidable portion.

19. The apparatus defined in claim 18, wherein each of said first slidable portion and said second slidable portion include;
   a) a side seal groove,
   b) a side seal gasket mounted in said side seal groove.

20. The apparatus defined in claim 19, wherein each of said first slidable portion and said second slidable portion further include;
   a) a material shaping surface, and
   b) a facing surface.

21. The apparatus defined in claim 20, wherein said stationary portion of said multi-part mold base further includes:
   a) a gasket groove, and
   b) a gasket mounted in said gasket groove.

22. The apparatus defined in claim 21, wherein said moveable side core further includes:
   a) a complemental material shaping surface,
   b) a cavity surface,
   c) a cavity seal groove provided in said cavity surface, and
   d) a cavity seal mounted in said cavity seal groove.

23. The apparatus defined in claim 22, and further including:
   a) a fluid operated cylinder connected to said first slidable portion to reciprocate the same into and out of contact with said stationary portion of said multi-part mold base, and
   b) a fluid operated cylinder connected to said second slidable portion to reciprocate the same into and out of contact with said stationary portion of said multi-part mold base.

24. The apparatus defined in claim 23, wherein said control means also controls said fluid operated cylinders.

* * * * *

UNITED STATES PATENT AND TRADEMARK OFFICE
CERTIFICATE OF CORRECTION

| | |
|---|---|
| PATENT NO. | : 6,123,535 |
| APPLICATION NO. | : 08/898207 |
| DATED | : September 26, 2000 |
| INVENTOR(S) | : Charles E. Ash et al. |

It is certified that error appears in the above-identified patent and that said Letters Patent is hereby corrected as shown below:

On the title page:   item [75], should read as follows:

Inventors:   Charles E. Ash, Perrysburg; Gary W. Bernier, Waterville, both of Ohio; David W. Lahnala, Adrian, Mich.; H. Richard Voght, Perrysburg, Ohio; John H. Gillen, Ottawa Lake, Mich.

Signed and Sealed this

Seventh Day of August, 2007

JON W. DUDAS
*Director of the United States Patent and Trademark Office*